United States Patent
Lefevre et al.

(10) Patent No.: US 12,081,926 B2
(45) Date of Patent: Sep. 3, 2024

(54) APPARATUS AND A METHOD FOR TRANSMITTING AND RECEIVING IN A PASSIVE OPTICAL NETWORK

(71) Applicant: Nokia Solutions and Networks Oy, Espoo (FI)

(72) Inventors: Yannick Lefevre, Heverlee (BE); Wouter Lanneer, Antwerp (BE); Werner Coomans, Zellik (BE)

(73) Assignee: Nokia Solutions and Networks Oy, Espoo (FI)

( * ) Notice: Subject to any disclaimer, the term of this patent is extended or adjusted under 35 U.S.C. 154(b) by 171 days.

(21) Appl. No.: 17/949,553

(22) Filed: Sep. 21, 2022

(65) Prior Publication Data

US 2023/0100191 A1   Mar. 30, 2023

(30) Foreign Application Priority Data

Sep. 24, 2021   (EP) .................................... 21198702

(51) Int. Cl.
*H04B 10/00* (2013.01)
*H04J 14/02* (2006.01)
*H04Q 11/00* (2006.01)
*H04B 10/27* (2013.01)
*H04J 14/00* (2006.01)

(52) U.S. Cl.
CPC ...... *H04Q 11/0067* (2013.01); *H04J 14/0282* (2013.01); *H04B 10/27* (2013.01)

(58) Field of Classification Search
CPC .... H04J 14/08; H04J 14/086; H04B 10/2587; H04B 10/272
See application file for complete search history.

(56) References Cited

U.S. PATENT DOCUMENTS

2017/0078028 A1*  3/2017  Zhang ................ H04B 10/0795
2019/0089463 A1*  3/2019  Zhang .................... H04B 10/27

FOREIGN PATENT DOCUMENTS

WO   WO-2019/076340 A1   4/2019

OTHER PUBLICATIONS

European Search Report for European Patent Application No. 21198702 dated Mar. 9, 2022.

* cited by examiner

*Primary Examiner* — Daniel G Dobson
(74) *Attorney, Agent, or Firm* — Harness, Dickey & Pierce, P.L.C.

(57) ABSTRACT

The method includes sending a first frame of a first modulation format that is suitable for a first group of receivers before sending a second frame of a second modulation format that is suitable for a second group of receivers, wherein the first modulation format is a higher modulation format than the second modulation format, and wherein the method further includes inserting into the first frame at least one symbol of the second modulation format at at least one outer edge of the first frame.

15 Claims, 8 Drawing Sheets

APPARATUS AND A METHOD FOR TRANSMITTING AND RECEIVING IN A PASSIVE OPTICAL NETWORK

CROSS-REFERENCE TO RELATED APPLICATIONS

This application claims priority to and the benefit of European Patent Application No. 21198702.9 filed on Sep. 24, 2021, the entire contents of each of which are incorporated herein by reference.

FIELD OF THE INVENTION

The invention relates to an apparatus for transmitting and a method for use in a transmitter of a passive optical network. The invention relates to an apparatus for receiving and a method for use in a receiver of a passive optical network.

BACKGROUND

Downstream passive optical networks comprise point-to-multi-point connections between a transmitter and multiple receivers. In downstream passive optical networks, physical-layer frames, i.e. PHY frames, are used to synchronize a data transmission between sender and receiver. A PHY frame may comprise a plurality of modulation frames. The transmitter in such connections sends modulation frames in the same modulation format that the receivers are configured to receive. It is desirable to also enable communication using different modulation formats.

Sending modulation frames comprising symbols of different modulation formats may introduce a larger number of errors near these frames' boundaries. This may be caused by a decision device in an equalizer or a clock-recovery scheme demapping a different modulation format than what it has been designed for.

SUMMARY

The apparatus and the method according to the independent claims enable grouping of different modulation formats.

The method for use in a transmitter of a passive optical network, PON, comprises: sending a first frame of a first modulation format that is suitable for a first group of receivers and sending a second frame of a second modulation format that is suitable for a second group of receivers, wherein the first modulation format is a higher modulation format than the second modulation format, and wherein the method further comprises inserting into the first frame at least one symbol of the second modulation format at at least one outer edge of the first frame.

According to some embodiment, the method further comprises inserting the at least one symbol of the second modulation format at a rear-end of the first frame.

According to some embodiment, the method further comprises inserting at least one symbol of the second modulation format at a front-end of the first frame and inserting at least one symbol of the second modulation format at a rear-end of the first frame.

According to some embodiment, the method further comprises determining the at least one symbol of the second modulation format, that is inserted into the first frame, by overwriting at least one bit related with at least one of the symbols of the first modulation format to reduce the modulation order to the second modulation format.

According to some embodiment, the first frame and second frame have the same length or wherein their lengths are plurals of a same base length, wherein the method further comprises determining the at least one symbol of the second modulation format according to a predetermined pattern or a quasi random pattern.

According to some embodiment, the first frame comprises one or more codewords of a first code and/or wherein the second frame comprises one or more codewords of a second code.

According to some embodiment, the first frame comprises two or more codewords and the codewords are interleaved.

The method for use in a receiver of a passive optical network, PON, comprises: receiving a first frame of a first modulation format that is suitable for a first group of receivers and receiving a second frame of a second modulation format that is suitable for a second group of receivers, wherein the first modulation format is a higher modulation format than the second modulation format, and wherein the method further comprises decoding the first frame, wherein decoding comprises treating at least one bit related with at least one symbol in the first frame at at least one outer edge of the first frame as unknown.

The apparatus for transmitting in a passive optical network, PON, is configured for sending a first frame of a first modulation format that is suitable for a first group of receivers and sending a second frame of a second modulation format that is suitable for a second group of receivers, wherein the first modulation format is a higher modulation format than the second modulation format, and wherein the apparatus for transmitting is further configured for inserting into the first frame at least one symbol of the second modulation format at at least one outer edge of the first frame.

According to some embodiment, the apparatus is further configured for inserting the at least one symbol of the second modulation format at a rear-end of the first frame.

According to some embodiment, the apparatus is further configured for inserting at least one symbol of the second modulation format at a front-end of the first frame and inserting at least one symbol of the second modulation format at a rear-end of the first frame.

According to some embodiment, the apparatus is further configured for determining the at least one symbol of the second modulation format, that is inserted into the first frame, by overwriting at least one bit related with at least one of the symbols of the first modulation format to reduce the modulation order to the second modulation format.

According to some embodiment, the first frame and second frame have the same length or wherein their lengths are plurals of the same base length, wherein the apparatus is further configured for determining the at least one symbol of the second modulation format according to a predetermined pattern or a quasi random pattern.

According to some embodiment, the first frame comprises one or more codewords of a first code and/or wherein the second frame comprises one or more codewords of a second code.

According to some embodiment, the first frame comprises two or more codewords and the codewords are interleaved.

The apparatus for receiving in a passive optical network, PON, wherein the apparatus is configured for receiving a first frame of a first modulation format that is suitable for a first group of receivers before receiving a second frame of a second modulation format that is suitable for a second group of receivers, wherein the first modulation format is a higher modulation format than the second modulation format, and wherein the apparatus for receiving is further configured for decoding the first frame, wherein decoding comprises treating at least one bit related with at least one symbol in the first frame at at least one outer edge of the first frame as unknown.

DESCRIPTION OF THE EMBODIMENTS

Downstream passive optical networks (PONs) may provide broadband access. They may have a point-to-multipoint (P2MP) topology, in which one optical line terminal (OLT) at a network side is used to connect to a multitude, e.g. up to 64, of optical network units (ONUs) at a user side.

Figure 1:
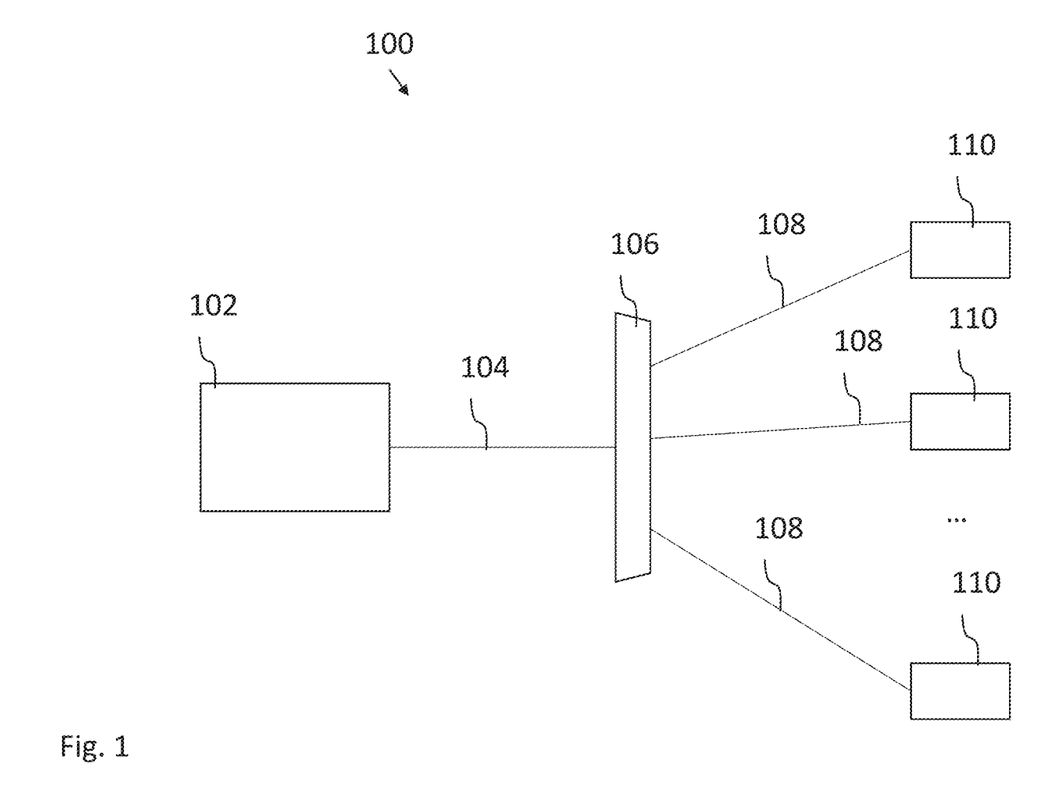
FIG. 1 schematically depicts a part of an optical distribution network.

FIG. 1 schematically depicts a part of an optical distribution network (ODN) 100 or fiber plant that contains optical fibers and splitters, but no active components. An OLT 102 is connected via an optical fiber 104 to a splitter 106. The splitter 106 is connected via respective fibers 108 to a plurality of ONUs 110.

Most PON technologies such as G-PON, E-PON, and XGS-PON are time-division multiplexing (TDM) PON technologies, in which the fiber medium is shared in time between the different ONUs. In addition, time- and wavelength-division multiplexing (TWDM) PON technologies exist, such as NG-PON2, in which multiple TDM systems at different wavelength are stacked on the same PON system. The disclosure herein applies to both TDM and TWDM PON systems.

The disclosure herein relates to ONU grouping. ONU grouping is also referred to as codeword (CW) grouping.

The ONU grouping concept comprises dividing the ONUs in multiple groups. The ONU grouping concept comprises transmitting the data for each group using separate forward error correction (FEC) CWs. The ONU grouping concept comprises assigning a modulation order to each group.

In the context of this application, the data for different groups is transmitted in different modulation frames.

The disclosure herein relates to Application-Specific Integrated Circuits (ASICs) that enable communication to ONUs using different modulation formats within a same downstream (DS) physical-layer (PHY) frame. In this context, the modulation formats in the same DS PHY frame may comprise 100G PAM4 and 50G NRZ symbols that are mixed in the same DS PHY frame. This sort of operation would leverage two different modulation formats in the DS direction, namely NRZ for 50G and PAM4 for 100G. Other types of symbols may be mixed alike. NRZ in this context refers to non-return to zero. PAM in this context refers to pulse amplitude modulation, wherein in PAM4 the 4 is the number of possible symbol values.

PON technologies may employ bandwidth-limited reception in combination with digital signal processing (DSP) and/or equalization. For instance, a 50G PON may receive using 25G optics. This bandwidth limitation may cause significant inter symbol interference (ISI), i.e., received samples will not only depend on the corresponding transmitted data symbol, but will also be affected by the previous and/or following data symbols.

In addition, due to the increased line rate speeds, PON technologies may be more strongly affected by chromatic dispersion due to the fiber propagation. Even though these systems may operate in the O-band, i.e. close to the zero-dispersion wavelength at 1310 nm, a large frequency content of the 50G signals may create a very strong dispersion impact leading to additional ISI.

PON technologies may use an analog-to-digital converter (ADC) at a receiver, in combination with DSP-based channel equalization and FEC techniques to recover information symbols that are corrupted by ISI and to enable reliable communication. The channel equalization deals with ISI and aims to provide an interference-free receive symbol sequence to the FEC decoder.

Since the DS signal is broadcast to all ONUs, ONUs operating in NRZ mode will also receive the PAM4 signals. An equalizer that is trained or configured for one specific modulation format and that operates on the DS signal may as a result experience higher error rates near frame boundaries between different modulation formats. In particular, an equalizer making implicit assumptions about the modulation format may experience higher error rates. Examples of such equalizers are decision feedback equalizers (DFE) and maximum likelihood sequence estimation (MLSE) equalizers.

This may introduce a larger number of errors near these frame boundaries, which is for instance caused by the decision device in the DFE demapping a different modulation format than what it has been designed for.

The disclosure herein proposes to insert a small number of guard symbols at at least one edge of a modulation frame to avoid these errors. A guard symbol in the example of PAM4 and NRZ may be a NRZ guard symbol. The modulation frame in this context may be a frame of symbols assigned to an ONU group. A modulation frame may be a frame of a first modulation format or a frame of a second modulation format. A DS PHY frame may comprise a modulation frame or multiple modulation frames.

An exact number of guard symbols that is used, may be determined depending on the equalizer that is used at the receiver. For example, for DFE-based equalizers, the number of guard symbols could, to compensate error propagation, only be slightly greater than the number of DFE taps. The number of DFE taps may be three. Switching from PAM4 to NRZ symbols without guard symbols may result in a bit error rate (BER) peak at the start of a NRZ frame. The peak may be reduced significantly after a few symbols.

By inserting guard symbols or guard bits, this BER peak is pushed outside the NRZ frame, such that it is significantly reduced already at the start of the NRZ frame.

For DFE-based equalizers, guard symbols may be introduced at the end of a high-modulation CW frame. For MLSE-based equalizers, guard symbols may be introduced both at the end and at the beginning of a high-modulation CW frame, because MLSE-based equalizers also take into account future received samples in their path metric decoding.

By way of example, for 50G PON applications, an equalizer window between 10-20 symbols may be used. Hence, the number of guard symbols may be selected not far greater than 10.

This introduces a very negligible overhead relative to the 17k bit in a single Low Density Parity Check Code (LDPC) CW of the typical LDPC code used for PON.

In some embodiments, this guard symbol insertion comprises to overwrite at least one least significant bit (LSB) of the higher modulation format with values that result in the symbols to be NRZ. For example, forcing the transmitter to only use the two outer PAM4 levels basically converts PAM4 to NRZ. This has a minimal implementation impact compared to a standard implementation.

By way of example, the following Gray-mapped PAM4 symbols comprising a most significant bit (MSB) and a LSB may be converted by overwriting the LSB with a fixed value:

| MSB/LSB | → | converted MSB/LSB |
|---------|---|-------------------|
| 10 | → | 10 |
| 11 | → | 10 |
| 01 | → | 00 |
| 00 | → | 00 |

NRZ guard symbols may be generated at the OLT by generating full PAM4 CWs, but then overwriting the LSBs of L, e.g. L=8, L=16 or L=32, PAM4 symbols at the edges of the PAM4 regions, thus obtaining NRZ.

This corresponds to introducing with ½ probability errors in L LSBs of the LDPC CW. This requires minimal changes to a transmission convergence (TC) layer pipeline, which is a significant implementation benefit.

Figure 2:
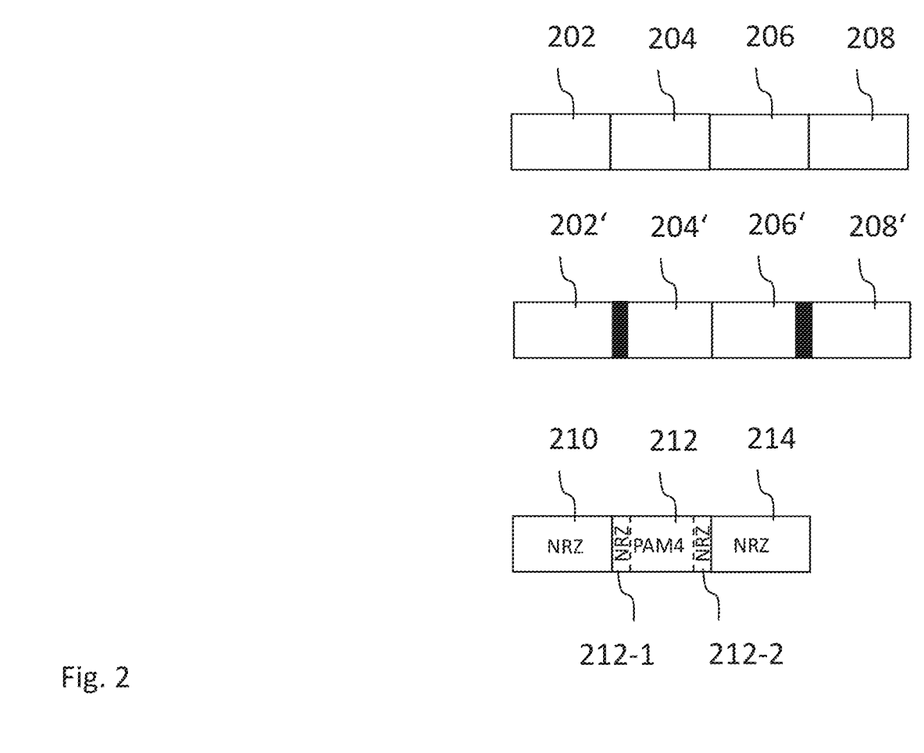
FIG. 2 schematically depicts a first approach for determining frames.

This approach is depicted schematically in FIG. 2.

According to an example depicted in FIG. 2, encoded data comprising, in this order, a first CW 202, a second CW 204, a third CW 206, and a fourth CW 208 is depicted. Overwriting PAM4 LSBs at the beginning and the end of the 2-CW PAM4 frame results in encoded data comprising, in this order, a first CW 202' that is unaltered, a second CW 204' and a third CW 206' wherein a number L of bits corresponding to the PAM4 LSBs of the first L and last L PAM4 symbols are overwritten, and a fourth CW 208' that is unaltered.

Modulating these CWs results in a first frame 210 comprising NRZ symbols, a second frame 212 comprising PAM4 symbols, and a third frame 214 comprising NRZ symbols. The second frame 212 comprises, at its front outer edge 212-1, at least one NRZ symbol. The second frame 212 comprises, at its rear outer edge 212-2, at least one NRZ symbol.

At the ONU there are two options to deal with this:
1) Decode at the receiver without taking into account that bits were overwritten at the transmitter, i.e., decoding with ½ probability errors introduced on the overwritten bits. Having a small number of errors with ½ probability in a LDPC CW typically has a small impact on the achieved bit error rate. This option can be implemented without any modification to the receiver. The receiver also does not have to be aware that the LSBs are being overwritten.
2) Explicitly treat the affected LSBs as erased or overwritten bits in the ONU decoder. This means these bits are explicitly treated as "unknown" values, without any information, rather than the erroneously decoded values. This improves the decoder performance when compared to the decoding with errors. In this option, the receiver may be configured for explicitly treating the affected LSBs as unknown values.

In some embodiments, codeword-interleaving is used. Codeword-interleaving is supported, e.g., in the ITU G.hsp 50G PON standard. This interleaving is especially useful for equalizer types like DFEs, which introduce error clustering or a correlation between errors. By interleaving a downstream transmit signal, these error clusters are separated out into different LDPC CWs, so that the errors within one CW are less correlated and that the decoding performance approaches that of the decoding performance in case of uncorrelated errors.

An interleaver may be a 4-CW bit-wise block interleaver, e.g. as disclosed in G.hsp. This means that a sequential order of the LDPC CW bits is maintained. Since the LDPC encoder is systematic, e.g. with the parity located at the end of a CW, the end of an interleaved block of CWs also comprises parity bits, e.g. parity belonging to four different CWs.

In some embodiments, guard symbols are on an interleaved downstream signal and an amount of overwriting to be performed on a single modulation frame, to obtain a certain number of guard symbols, may be spread over multiple CWs.

In some embodiments, e.g. if an interleaver depth is four, i.e. four CWs are block-interleaved, a fraction of the number of guard symbols may be overwritten in an individual CW. The disclosure herein is not limited to bit-wise interleaving. The interleaver may be configured to interleave in various other ways as well.

Figure 3:
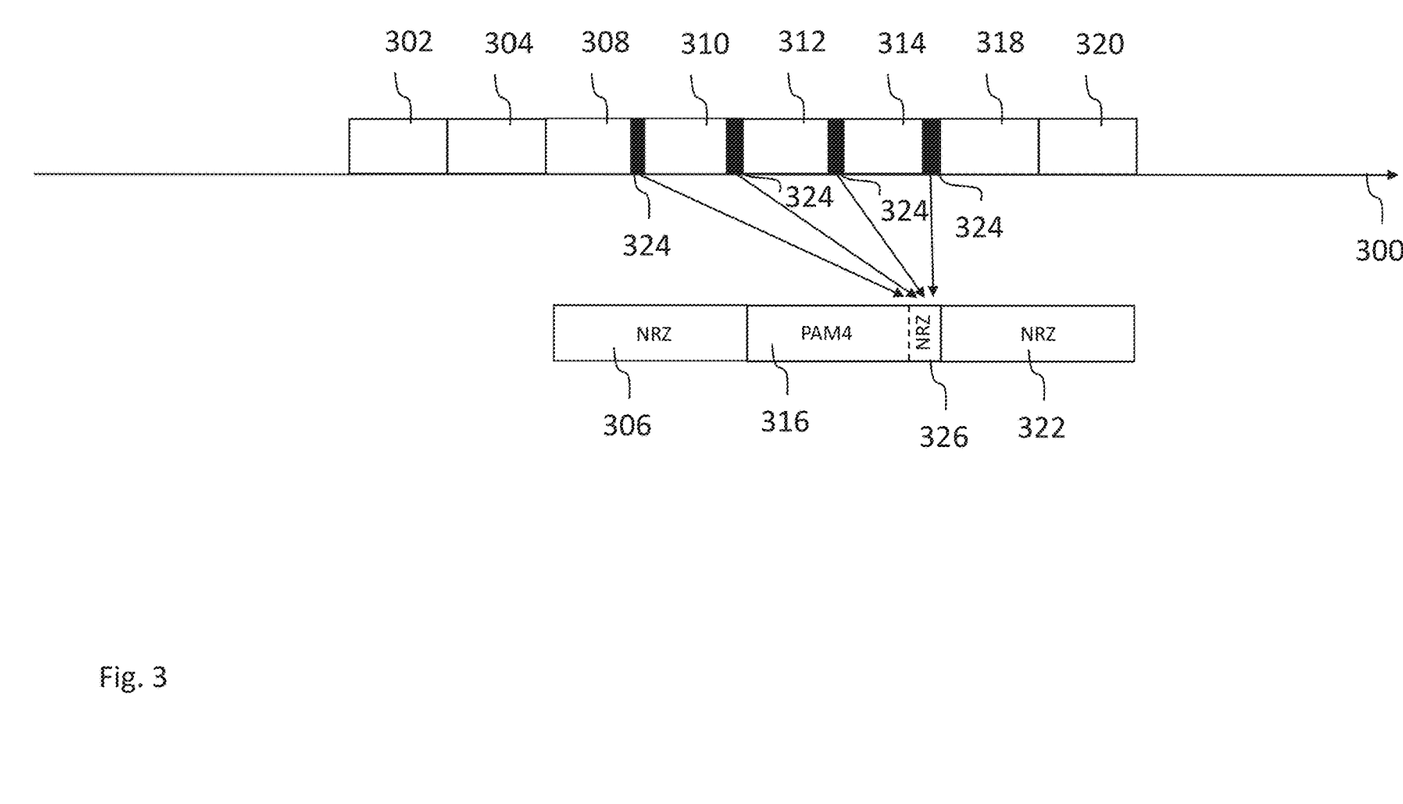
FIG. 3 schematically depicts a second approach for determining frames.

According to an example depicted in FIG. 3, a sequence over time 300 of two consecutive CWs 302, 304 constituting a first interleaved NRZ frame 306, a sequence over time 300 of four consecutive CWs 308, 310, 312, 314 constituting an interleaved PAM4 frame 316 and a sequence over time 300 of two consecutive CWs 318, 320 constituting a second NRZ frame 322 are depicted.

Based on the CWs 302, 304 constituting the first interleaved NRZ frame 306 the first interleaved NRZ frame 306 is determined. The first interleaved NRZ frame 306 may comprise two or more CWs and the CWs are interleaved.

Overwriting L bits corresponding to the LSBs of the guard symbols in the CWs 308, 310, 312, 314 constituting the interleaved PAM4 frame 316 results in the interleaved PAM4 frame 316.

Based on the CWs 318, 320 constituting the second interleaved NRZ frame 322, the second interleaved NRZ frame 322 is determined. The second interleaved NRZ frame 322 may comprise two or more CWs and the CWs are interleaved.

The interleaved PAM4 frame 316 comprises, at its rear outer edge 326, at least one NRZ symbol.

When applying interleaving, a lower amount of bits may be overwritten per CW, resulting in a reduced impact of the overwriting on the decoding performance.

In some embodiments, the LDPC codes of the PAM4 CWs are adjusted so that L less PAM4 bits are generated for the edge CWs. Unchanged LDPC codes are referred to as regular CWs.

LDPC codes that are changed as described herein are referred to as modified CWs. The last L symbols for which only L bits are available instead of 2L may then be generated as NRZ symbols. The LDPC codes may be adjusted by overwriting, shortening, or by using a different LDPC code, e.g. with a different parity check matrix.

Figure 4:
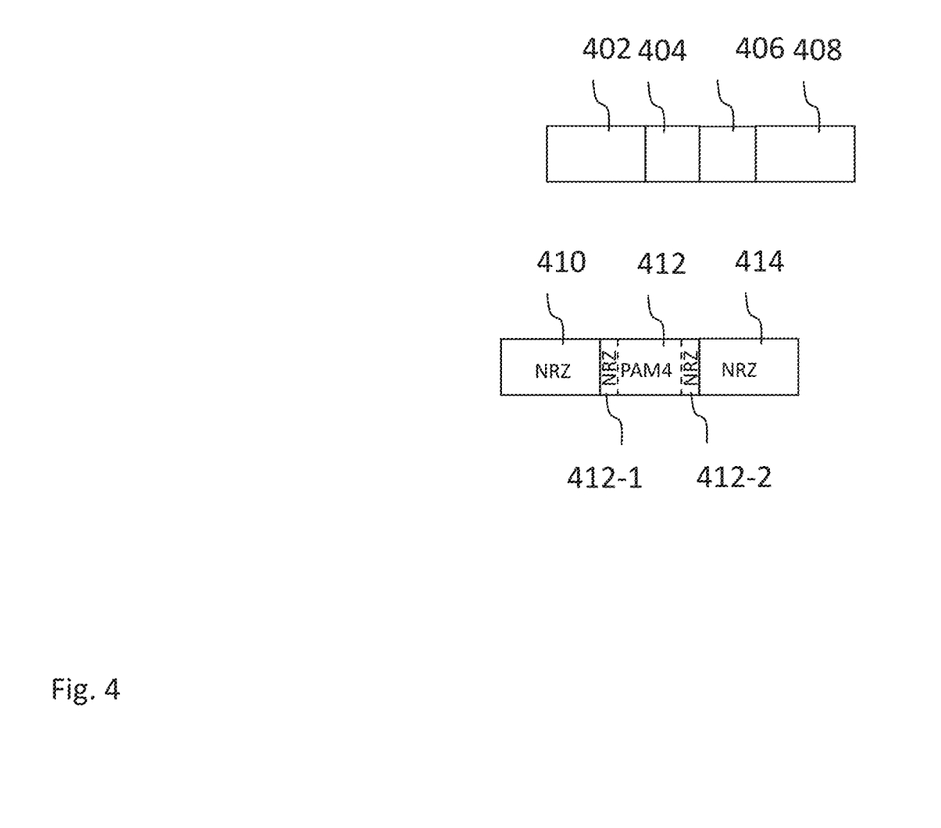
FIG. 4 schematically depicts a third approach for determining frames.

This is illustrated in FIG. 4. In FIG. 4, a sequence of, in this order, a first regular CW 402, a first modified CW 404, a second modified CW 406, and a second regular CW 408 are depicted.

The modified CWs are smaller than the regular CWs as they don't contain the L LSBs that would be overwritten. Instead, the modified CWs contain the MSBs. The MSBs are in the example directly mapped, e.g. with an NRZ mapper.

A corresponding first frame 410 comprises NRZ symbols. A corresponding second frame 412 comprises PAM4 symbols. A corresponding third frame 414 comprises NRZ symbols. The corresponding second frame 412 comprises, at its rear outer edge 412-1, at least one NRZ symbol. The second frame 412 comprises, at its front outer edge 412-2, at least one NRZ symbol.

In some embodiments, a guard symbol pattern, not containing any data, is inserted. This is equivalent to overwriting both the MSBs and the LSBs instead of only the LSBs of the PAM4 guard symbols with fixed predefined values. In some embodiments, a block of preconfigured symbols is inserted at the end of a sequential processing pipeline.

Figure 5:
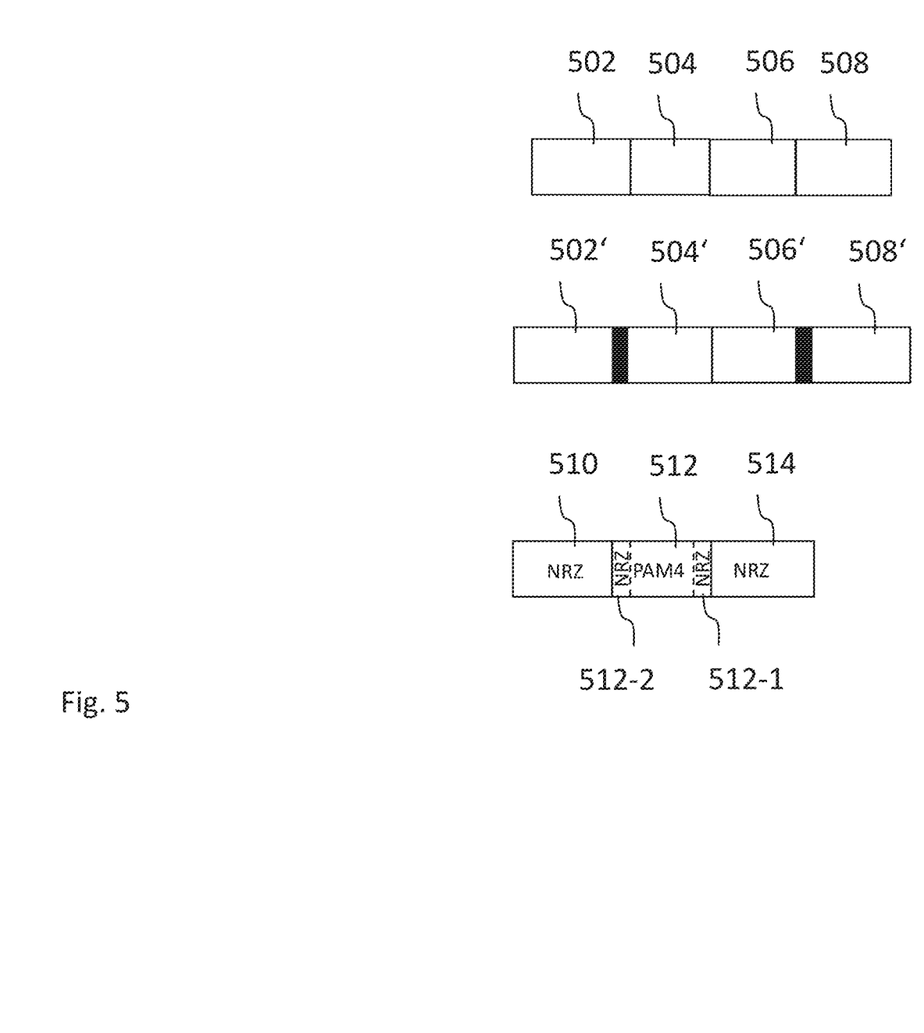
FIG. 5 schematically depicts a fourth approach for determining frames.

This is illustrated in FIG. 5. In FIG. 5, encoded data comprising, in this order, a first CW 502, a second CW 504, a third CW 506 and a fourth CW 508 is depicted. Inserting bits corresponding to the guard symbol pattern results in encoded data comprising, in this order, a first CW 502', a second CW 504', a third CW 506' and a fourth CW 508' wherein the bits corresponding to the guard symbols are inserted.

A bit pattern corresponding to the guard symbol pattern may be inserted at a location corresponding to the L guard symbols. The guard symbol pattern may be inserted by generating MSBs and then mapping with the NRZ mapper. The guard symbol may be inserted by generating fixed LSBs and MSBs and then mapping with a PAM4 mapper.

In some embodiments, the pattern at the end of the frame may be chosen specifically to improve the Clock Recovery of the NRZ ONU receivers just prior to the start of the reception of the NRZ data in the NRZ frame that is intended for them. For example, a longer pattern consisting of alternating bits 1 and 0 (i.e., 10101010 . . . ).

A corresponding first frame 510 comprises NRZ symbols. A corresponding second frame 512 comprises PAM4 symbols. A corresponding third frame 514 comprises NRZ symbols. The corresponding second frame 512 comprises, at its rear outer edge 512-1, at least one NRZ symbol. The corresponding second frame 512 comprises, at its front outer edge 512-2, at least one NRZ symbol.

In some embodiments, the guard symbols are inserted at the edges of every PAM4 CW or modulation sequence, e.g. in a static manner. This has the advantage of being simpler to process. In some embodiments, the guard symbols are only inserted when the modulation format changes. This is more difficult to implement, but results in less overhead.

The insertion of a guard NRZ symbol is compatible with legacy ONUs, e.g. 50G NRZ. Legacy ONUs can decode without being aware of the guard symbol insertion.

In some embodiments, a CW-alignment with respect to the symbols is maintained.

In some embodiments, in which LSBs are overwritten, the number of overwritten bits may be adjusted according to a tolerable reduction in decoding performance and thus sensitivity for the 100G PAM4 ONUs. In some embodiments, in which symbols are inserted that contain no data, the number of inserted symbols may be adjusted according to a tolerable impact on a throughput. The impacts on throughput and sensitivity may be traded-off by properly selecting the adjusted LDPC code. By way of example, a lower code rate will give better sensitivity; higher code rate will give higher throughput.

Figure 6:
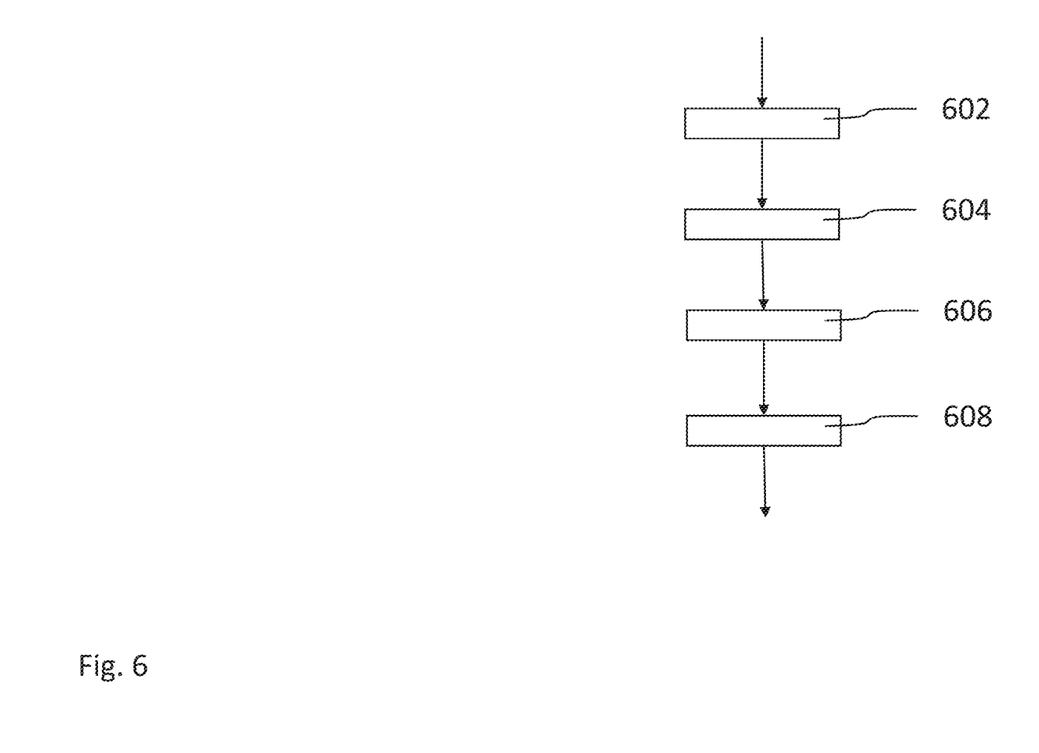
FIG. 6 depicts steps in a method for use in a transmitter.

A method for use in a transmitter of a PON is described below referencing FIG. 6. The method processes a sequence of CWs.

In some embodiments, the first frame comprises one or more CWs of a first code. In some embodiments, the second frame comprises one or more CWs of a second code.

The method comprises a step 602.

In step 602, symbols of the first modulation format for a first frame comprising symbols of the first modulation format are determined. In step 602, symbols of the second modulation format for a second frame comprising symbols of the second modulation format are determined.

The first modulation format is a higher modulation format than the second modulation format. The first modulation format in the example is PAM4. The second modulation format in the example is NRZ.

In step 602, at least one symbol of the second modulation format, e.g. NRZ, is determined, that is to be inserted into the first frame.

In some embodiments, the at least one symbol of the second modulation format, e.g. NRZ, is determined by overwriting at least one bit corresponding to one of the symbols of the first modulation format, e.g. PAM4 to reduce the modulation order to the second modulation format, e.g. NRZ.

In some embodiments, the first frame and second frame have the same length. In some embodiments, their lengths are plurals of the same base length.

In some embodiments, the at least one symbol of the second modulation format, e.g. NRZ, is determined according to a predetermined pattern or a quasi random pattern instead of useful data or information intended for the groups of receivers.

In some embodiments, the first frame comprises two or more codewords and the codewords are interleaved.

Afterwards, a step 604 is executed.

In the step 604, the first frame and the second frame are determined. The first frame is determined to comprise symbols of the first modulation format, e.g. PAM4. The second frame is determined to comprise symbols of the second modulation format, e.g. NRZ.

In the step 604, the at least one symbol of the second modulation format, e.g. NRZ, is inserted into the first frame.

In some embodiments, at least one symbol of the second modulation format, e.g. NRZ, is inserted into the first frame at at least one outer edge of the first frame.

In some embodiments, at least one symbol of the second modulation format, e.g. NRZ, is inserted at a rear-end of the first frame.

In some embodiments, at least one symbol of the second modulation format, e.g. NRZ, is inserted at a front-end of the first frame and at least one symbol of the second modulation format, e.g. NRZ, is inserted at a rear-end of the first frame.

In some embodiments, the first frame is determined to comprise symbols of the first modulation format, PAM4, for a number of interleaved codewords.

Afterwards, a step 606 and a step 608 is executed. The steps 606 and 608 may be executed in this order, with an at least partial time overlap, in parallel or in reversed order.

In the step 606, the first frame of the first modulation format, e.g. PAM4, is sent. The first frame is suitable for a first group of receivers.

In the step 608, the second frame of the second modulation format, e.g. NRZ, is sent. The second frame is suitable for a second group of receivers.

The disclosure herein is not limited to disjoint groups of receivers. The first group of receivers and the second group of receivers may comprise at least one common receiver.

Figure 7:
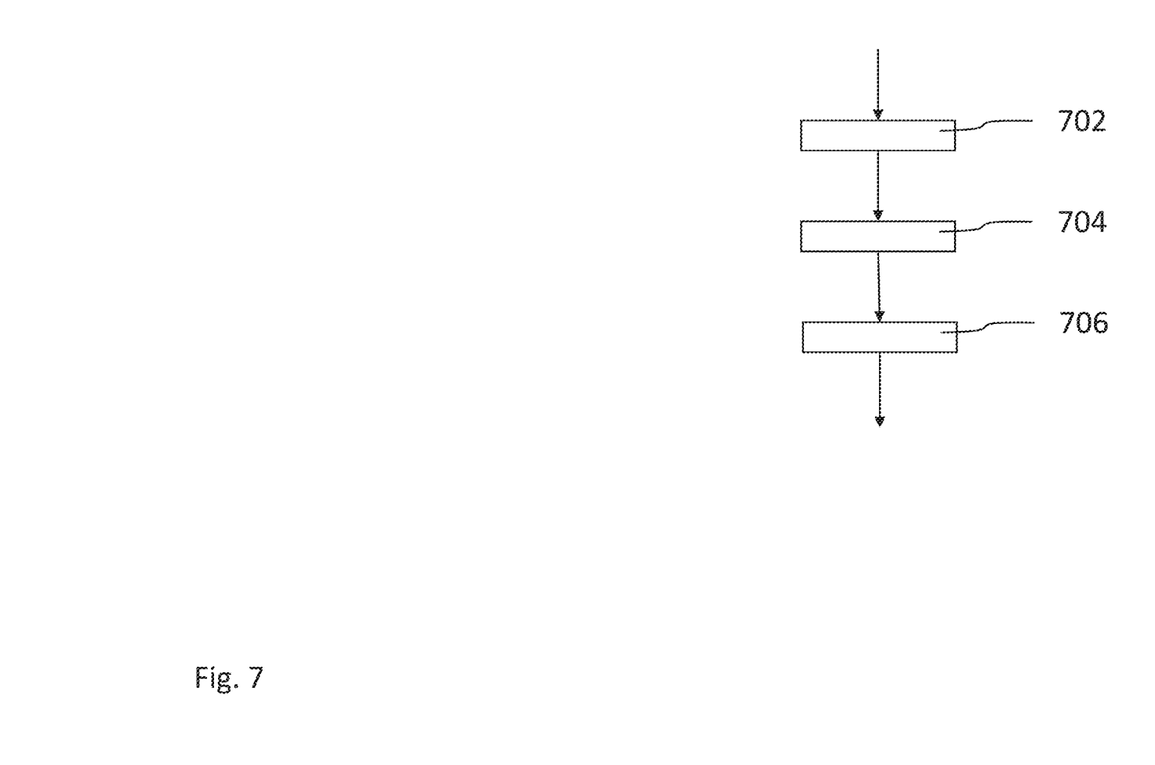
FIG. 7 depicts steps in a method for use in a receiver.

A method for use in a receiver of a PON is described below referencing FIG. 7.

The method comprises a step 702 and a step 704. The steps 702 and 704 may be executed in this order, with an at least partial time overlap, in parallel or in reversed order In step 702 a first frame of a first modulation format, e.g. PAM4, is received. The first frame is suitable for a first group of receivers.

Afterwards a step 704 is executed.

In step 704, a second frame of a second modulation format, e.g. NRZ, is received. The second frame is suitable for a second group of receivers.

The first modulation format is a higher modulation format than the second modulation format.

The first frame comprises at least one symbol of the second modulation format, e.g. NRZ, at at least one outer edge of the first frame.

Afterwards a step 706 is executed.

In some embodiments, step 706 may comprise decoding the first frame. Decoding may comprise treating at least one bit related with at least one symbol in the first frame at at least one outer edge of the first frame as unknown.

In some embodiments, step 706 may comprise directly decoding bits that are demapped from the symbols, without any additional processing.

In some embodiments, step 706 may comprise explicitly treating bits that are overwritten by the transmitter as unknown before forwarding to a LDPC decoder. For example, a log likelihood ratio LLR=0 is inserted before forwarding to the LDPC decoder. The LLR=0 may be inserted at a predetermined bit position. The predetermined bit position may correspond to the position of the bits that the transmitter overwrites.

Figure 8:
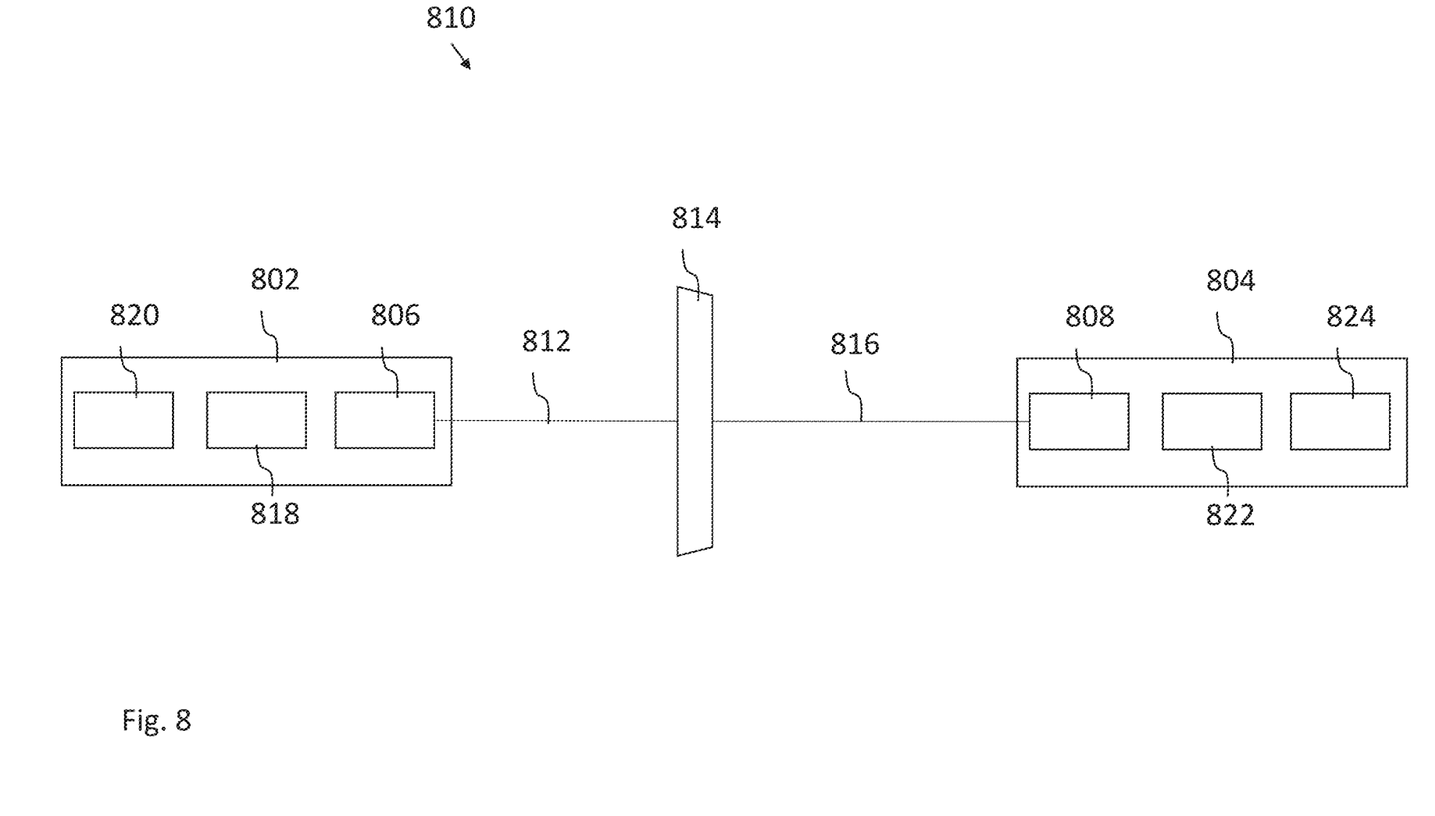
FIG. 8 schematically depicts a part of a passive optical network.

An apparatus for transmitting 802 and an apparatus for receiving 804 are described below with reference to FIG. 8. The apparatus for transmitting 802 comprises a transmitter 806. The apparatus for receiving 804 comprises a receiver 808. A PON 810 comprises a fiber 812 for connecting the transmitter 806 to a splitter 814. The PON 810 comprises a fiber 816 for connecting the splitter 814 to the receiver 808.

The apparatus for transmitting 802 comprises processing means 818, e.g. at least one processor. The apparatus for transmitting 802 comprises storage means 820, e.g. at least one storage. The processor 818 is configured to execute instructions stored in the storage 820 (e.g., memory such as RAM, ROM, etc.) to perform a method according to an example embodiment.

The apparatus for receiving 804 comprises processing means 822, e.g. at least one processor. The apparatus for receiving 804 comprises storage means 824, e.g. at least one storage. The processor 822 is configured to execute instructions stored in the storage 824 (e.g., memory such as RAM, ROM, etc.) to perform a method according to an example embodiment.

The apparatus for transmitting 802 is configured for sending the first frame of the first modulation format.

The apparatus for transmitting 802 is configured for sending the second frame of the second modulation format.

The apparatus for transmitting 802 is configured for sending the first frame for the first group of receivers.

The apparatus for transmitting 802 is configured for sending the second frame for the second group of receivers.

The first group of receivers and the second group of receivers may comprise at least one common receiver.

The apparatus for transmitting 802 is configured for inserting into the first frame at least one symbol of the second modulation format at at least one outer edge of the first frame.

In some embodiments, the apparatus for transmitting 802 is further configured for inserting the at least one symbol of the second modulation format at a rear-end of the first frame.

In some embodiments, the apparatus for transmitting 802 is further configured for inserting at least one symbol of the second modulation format at a front-end of the first frame and inserting at least one symbol of the second modulation format at a rear-end of the first frame.

In some embodiments, the apparatus for transmitting 802 is further configured for determining the at least one symbol of the second modulation format, that is inserted into the first frame, by overwriting at least one bit that corresponds to a symbol in the symbols of the first modulation format to reduce the modulation order to the second modulation format.

In some embodiments, the apparatus for transmitting 802 is further configured for determining the first frame comprising symbols of the first modulation format for a number of interleaved codewords.

In some embodiments, the apparatus for transmitting 802 is further configured for determining the at least one symbol of the second modulation format according to a predetermined pattern or a quasi random pattern instead of useful data or information intended for the groups of receivers.

The apparatus for receiving 804 is configured for receiving the first frame of the first modulation format. This means, the apparatus for receiving 804 in the example is in the first group of receivers.

The apparatus for receiving 804 is further configured for decoding the first frame and treating at least one bit related with at least one symbol in the first frame at at least one outer edge of the first frame as unknown.

The invention claimed is:

1. A method for use in a transmitter of a passive optical network, PON, wherein the method comprises:
    sending a first frame of a first modulation format that is suitable for a first group of receivers;
    sending a second frame of a second modulation format that is suitable for a second group of receivers, wherein the first modulation format is a higher modulation format than the second modulation format; and
    inserting into the first frame at least one symbol of the second modulation format at at least one outer edge of the first frame.

2. The method according to claim 1, wherein the inserting inserts the at least one symbol of the second modulation format at a rear-end of the first frame.

3. The method according to claim 1, wherein the inserting inserts at least one symbol of the second modulation format at a front-end of the first frame and inserts at least one symbol of the second modulation format at a rear-end of the first frame.

4. The method according to claim 1, wherein the method further comprises determining the at least one symbol of the second modulation format, that is inserted into the first frame, by overwriting at least one bit related with at least one of the symbols of the first modulation format to reduce the modulation order to the second modulation format.

5. The method according to claim 1, wherein the first frame and the second frame have a same length or wherein lengths thereof are multiples of a same base length, wherein the method further comprises determining the at least one symbol of the second modulation format according to a pattern or a quasi random pattern.

6. The method according to claim 1, wherein the first frame comprises one or more codewords of a first code and/or wherein the second frame comprises one or more codewords of a second code.

7. The method according claim 6, wherein the first frame comprises two or more codewords and the codewords are interleaved.

8. A method for use in a receiver of a passive optical network, PON, wherein the method comprises:
    receiving a first frame of a first modulation format that is suitable for a first group of receivers;
    receiving a second frame of a second modulation format that is suitable for a second group of receivers, wherein the first modulation format is a higher modulation format than the second modulation format;
    decoding the first frame, wherein the decoding comprises treating at least one bit related with at least one symbol in the first frame at at least one outer edge of the first frame as unknown.

9. An apparatus for transmitting in a passive optical network, PON, wherein the apparatus is configured to perform sending a first frame of a first modulation format that is suitable for a first group of receivers; sending a second frame of a second modulation format that is suitable for a second group of receivers, wherein the first modulation format is a higher modulation format than the second modulation format, and wherein the apparatus for transmitting is further configured to perform inserting into the first frame at least one symbol of the second modulation format at at least one outer edge of the first frame.

10. The apparatus according to claim 9, wherein the apparatus is further configured to perform inserting the at least one symbol of the second modulation format at a rear-end of the first frame.

11. The apparatus according to claim 9, wherein the apparatus is further configured to perform inserting at least one symbol of the second modulation format at a front-end of the first frame and inserting at least one symbol of the second modulation format at a rear-end of the first frame.

12. The apparatus according to claim 9, wherein the apparatus is further configured to perform determining the at least one symbol of the second modulation format, that is inserted into the first frame, by overwriting at least one bit related with at least one of the symbols of the first modulation format to reduce the modulation order to the second modulation format.

13. The apparatus according to claim 12, wherein the first frame and the second frame have a same length or wherein lengths thereof are multiples of a same base length, wherein the apparatus is further configured to perform determining the at least one symbol of the second modulation format according to a pattern or a quasi random pattern.

14. The apparatus according to claim 9, wherein the first frame comprises one or more codewords of a first code and/or wherein the second frame comprises one or more codewords of a second code.

15. An apparatus for receiving in a passive optical network, PON, wherein the apparatus is configured to perform receiving a first frame of a first modulation format that is suitable for a first group of receivers before receiving a second frame of a second modulation format that is suitable for a second group of receivers, wherein the first modulation format is a higher modulation format than the second modulation format, and wherein the apparatus for receiving is further configured to perform decoding the first frame, wherein the decoding comprises treating at least one bit related with at least one symbol in the first frame at at least one outer edge of the first frame as unknown.

* * * * *